United States Patent [19]

Pentel

[11] 4,072,131
[45] Feb. 7, 1978

[54] SPARK IGNITION DEVICE AND FUEL INSECTION MEANS FOR INTERNAL COMBUSTION ENGINES

[76] Inventor: Jerry Pentel, 11 Glenn Drive, Flanders, N.J. 07836

[21] Appl. No.: 722,879

[22] Filed: Sept. 14, 1976

[51] Int. Cl.$^2$ .................. F02B 53/10; F02B 53/12; F02B 3/02

[52] U.S. Cl. .................. 123/8.09; 123/32 SJ; 123/143 B

[58] Field of Search ............... 123/8.09, 32 SJ, 143 B, 123/169 PA, 143 R, 148 R, 169 R

[56] References Cited

U.S. PATENT DOCUMENTS

| | | | |
|---|---|---|---|
| 826,123 | 7/1906 | Smith | 123/143 R |
| 2,904,610 | 9/1959 | Morrison | 123/169 R |
| 3,227,145 | 1/1966 | Bernard | 123/8.09 |
| 3,926,169 | 12/1975 | Leshner et al. | 123/8.09 |

Primary Examiner—Carlton R. Croyle
Assistant Examiner—Leonard Smith
Attorney, Agent, or Firm—Thomas N. Neiman

[57] ABSTRACT

In one embodiment of the invention, the engine comprises a rotary-piston, Wankel-type machine having a ceramic-material housing. Within the wall of the housing are confined pluralities of passageways which provide conduits for the conduct therethrough of coolant, for the introduction of a primary or secondary fuel, and for the ignition of the wall-confined-passageway-supplied fuel. The coolant passageways open only externally of the housing, whereby the same supply and discharge coolant to dissipate engine heat. The fuel passageways have openings, which open onto the inner wall of the housing, for supplying air/gasoline-vapor mixture, or methane, or hydrogen, or diesel oil, etc. The ignition passageways confine electrical leads, which leads have a spark-gap interruption formed in each thereof, and also have openings which open onto the inner wall of the housing — the interruptions being disposed in registry with the openings. Further, the openings in the fuel passageways and the ignition passageways are in immediate adjacency — to effect controlled combustion. With reference to the direction of piston travel, pairs of fuel and ignition openings are spaced apart along the inner surface of the housing wall so that a cascade-effect combustion can be generated.

11 Claims, 9 Drawing Figures

SPARK IGNITION DEVICE AND FUEL INSECTION MEANS FOR INTERNAL COMBUSTION ENGINES

This invention pertains to internal combustion engines, and in particular to I.C. engines in which means are provided for improving the fueling and/or fuel ignition thereof.

In prior art internal combustion engines, it is conventional to supply one given fuel — commonly an air/-gasoline vapor mixture — to the combustion chamber, and one ignition device — commonly a spark plug — for igniting the fuel. Now, I have determined that an internal combustion engine can be made to perform more efficiently if a plurality of fuels are sequentially introduced into the combustion chamber, and also if the input fuels are serially, but rapidly, ignited. The primary fuel and ignition thereof will surely impel the piston in its power or "work" stroke; yet, immediately following and successive ignitions of sequentially injected fuels will provide added impetus to the piston in its "work" stroke. To know this is not to solve the problem; neither is it productive of a machine which will provide the benefit. What has been needed is an improved internal combustion engine which will offer this efficiency and, in a novel way, ingest a plurality of fuels and, in rapid succession, ignite such fuels in proper, optimum sequence.

It is an object of this invention to set forth such an improved internal combustion engine. Particularly, it is an object of this invention to disclose an internal combustion engine comprising a housing having an arcuate wall; said housing having a combustion chamber therewithin; a piston supported within said housing for movement in at least one direction; means formed in said housing for evacuating exhaust product from said combustion chamber; first means for supplying fuel to, and for igniting said fuel in, said combustion chamber; wherein said first means comprise a first plurality of longitudinal passageways formed within said housing wall, each passageway of said plurality thereof having a given opening which opens interally of said wall onto said combustion chamber; and said given openings of at least one pair of said passageways open onto said combustion chamber, within a prescribed location in said wall, in adjacency to each other; further including an electrical conduit, with a spark-gap interruption formed therein, disposed in at least one passageway of said pair; means for supplying electrical potential to said conduit; and means for supplying fuel to at least one passageway of said pair.

Further objects of this invention, as well as the novel features thereof, will become more apparent by reference to the following description taken in conjunction with the accompanying figures, in which.

Figure 6:
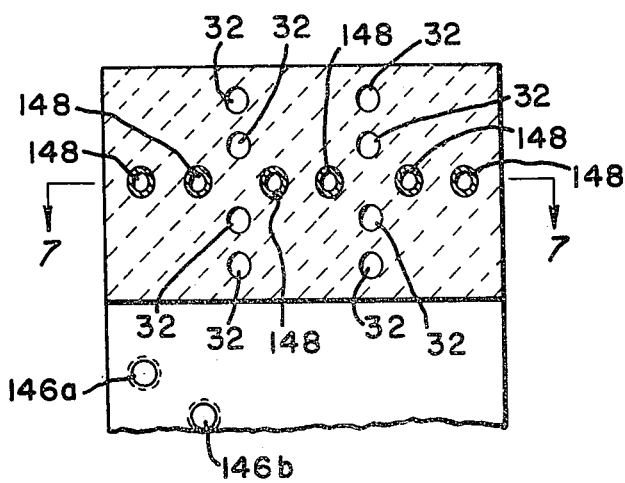
Figure 7:
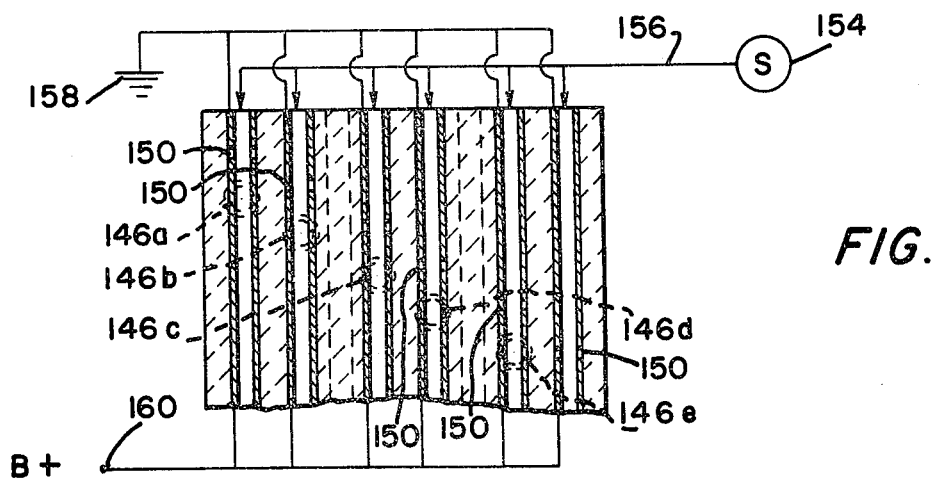
Figure 8:
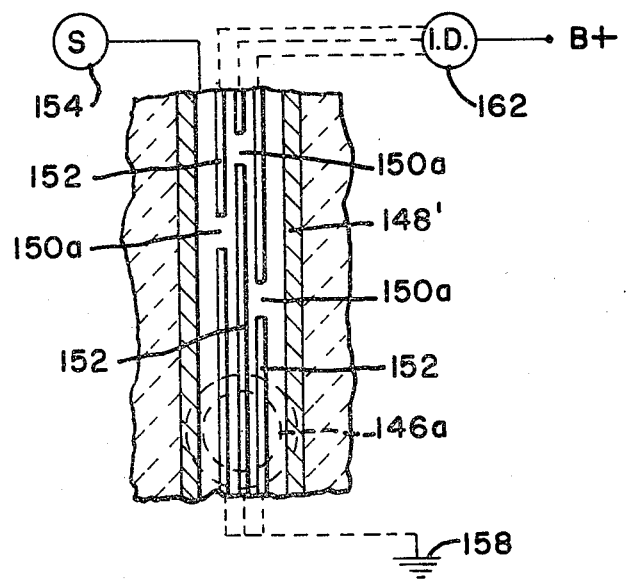

FIGS. 6, 7, and 8 depict alternative embodiments of the invention.

The embodiment of the invention set forth in FIGS. 1 through 5 is depicted in conjunction with a rotary, internal combustion engine 10, of the Wankel type, which comprises a housing 12 having a wall which defines a combustion chamber 14 therewithin. In the manner well known, an air/fuel-vapor mixture is ingested into the chamber 14 by means of an inlet port 16 for compression thereof by a multi-lobed rotary piston 18, and ignition thereof by a spark plug 20. Ignition of the mixture, of course, creates an expanding pressure which operates on the piston 18 to drive it in rotation — in the direction of the arrow. The standard gearing 22, in cooperation with an eccentric element 24, causes the piston 18 to impart rotary torque to a power take-off shaft 26. The combustion product, in turn, is expelled from the engine 10 via an exhaust port 28. As described thus far, internal combustion engines of this type are well known, thus a more detailed discussion of the structuring and/or operation thereof is not believed to be necessary.

Accordingly, the ensuing description will disclose the use of typical spark plugs, but does not pursue any description of conventional ignition systems therefor — i.e., rotary distributors, condensers, points, etc. — as such are believed to be well known and understood, and such conventional ignition/idstribution systems are contemplated for use in my invention and novel embodiments thereof. Too, as noted in the Abstract, fuel conduits or passageways defined in the following text accommodate "fuel" — i.e., air/gasoline-vapor mixtures, or some similar volatile, hydrocarbon vapor and air, or the like, it being understood that gasoline, per se or diesel oil per se are not internal combustion fuels but become so only upon the same being volatilized and admixed with an optimum quantity of air or oxygen, to support conbustion. Accordingly, the ensuring description does not disclose carburetion systems, air/vapor inlet manifolds, fuel pumps, etc. All such apparatus, also, is believed to be well understood by those skilled in this art, and only conventional apparatus of that type is proposed for use in my invention. Therefore, where the following text references a "fuel distributor" or an "ignition distributor", nothing other than tha which is conventional for fuel and ignition systems is implied. Specifically, valving for the "fuels" isnot any different than that notoriously practiced in known internal combustion engines; that is to say that exhaust valves opened and closed by a camshaft, and inlet valves interposed between the fuel source and the combustion areas, are comprehended by the invention. The use of such, and the specific locations thereof, are not presented herein, but it is to be understood that such are implictedly employed. These known engines, typically,a re cooled by cored passageways formed in the walls of the engine to receive coolant. In design and manufacturer of course, the casting of housing with cored passageways is rather complex and expensive. Too, the known engines commonly have but one fuel and one fuel inlet; futher, such engines have but one ignition device at an optimum location in the combustion chamber. Yet, as noted priorly, such engines can have the performance thereof vastly improved if the same are designed and manufactured with options for further fuels, diverse fuels, and/or sequential fueling and ignition. Also, engine manufacture can be pursued with less expense, while yielding a more durable engine, if a new, novel approach to the cooling thereof were to be practiced.

My novel engine 10 is formed of a housing 12 of ceramic material. Alternatively, of course, a composition material may be used. Ceramics, as can be appreciated, have a low coefficient of thermal expansion; they have sufficient mechanical strength at high engine temperatures, and a low heat conductivity. Too, ceramics can be molded and machined with great accuracy. Now then, it is my teaching to build the housing of ceramic material and, during the forming of the housing, to inlay conduits for the accommodation of coolants, fuels, and igniters.

Figure 1:
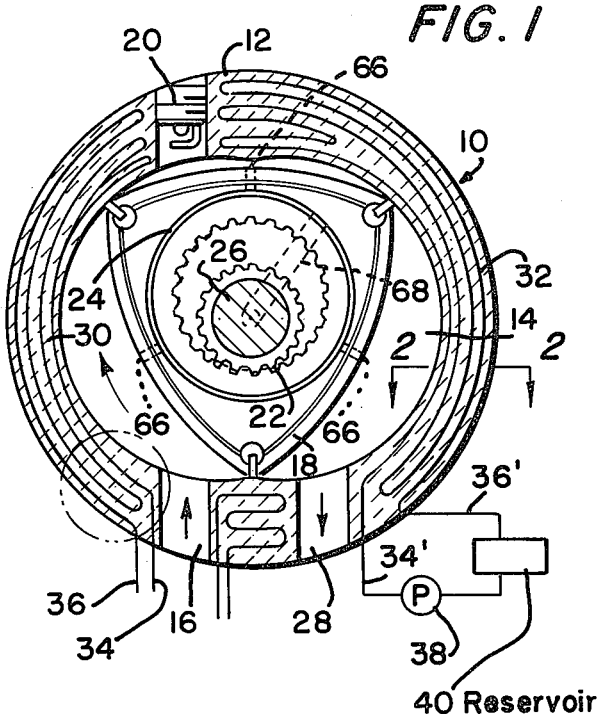
FIG. 1 is an elevational cross-sectional view of a rotary, internal combustion engine, the view taken transverse of the rotary axis, which embodies the invention.
Figure 1A:
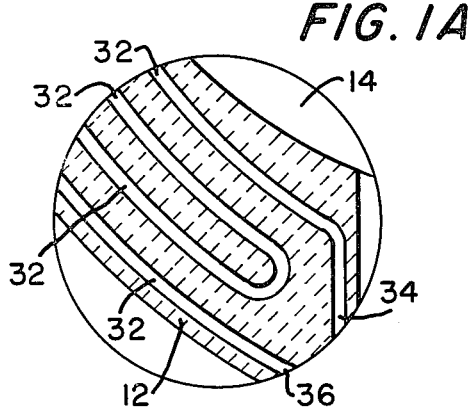
FIG. 1A is an enlarged view of a portion of FIG. 1.
Figure 2:
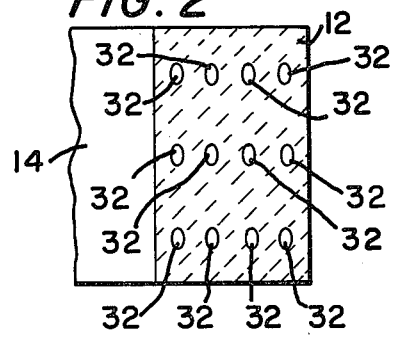
FIG. 2 is a fragmentary cross-section taken along section 2—2 of FIG. 1.

With reference to FIGS. 1 and 1A, for instance, my engine 10 has a conduit array 30 disposed in the housing 12, the array 30 lying in a given trans-axial plane of the housing. The array 30, in this embodiment, comprises one continuous conduit 32 arranged in serpentine fashion entering the housing at 34 and discharging at 36. Conduit 32 accommodates the circulation of coolant therethrough. As shown in FIG. 1 and FIG. 2, like coolant conduits 32 enter and emerge from this opposite wall of the housing 12 via 34' and 36'. All conduits 32, of course, are coupled to a pump 38 and reservoir 40. In a manner well known in the art, the reservoir is heat-exchanged to re-cool the coolant prior to its return to the housing.

Figure 3:
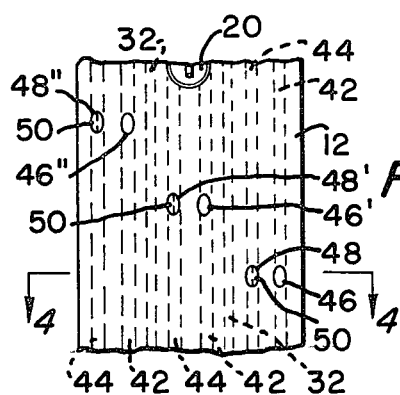
FIG. 3 is a fragmentary depiction of the inner wall of the combustion chamber of the engine of FIG. 1, the same taken from a wall area adjacent to the conventional spark plug.
Figure 4:
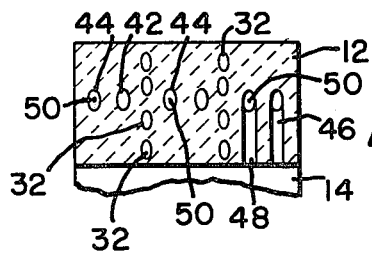
FIG. 4 is a fragmentary cross-section taken along section 4—4 of FIG. 3.

In addition to the coolant conduits 32, fuel and igniter conduits 42 and 44 are inlaid in the ceramic material during the forming of the engine housing 12. FIGS. 3 and 4 illustrate this inventive novelty to greater detail. With respect to the direction of the rotation of the rotary piston 18, FIG. 3 shows the wall of the combustion chamber 14 "downstream" of the conventional spark plug 20. As can be seen, the wall has a plurality of paired apertures formed therein. The same comprise openings onto the wall surface of underlying conduits 42 and 44. Clearly, the embedding of the conduits 42 and 44 within the ceramic material of the engine housing 12 strengthens and reinforces the housing and, thereby, provides an ancillary benefit and improvement.

In the cross-sectional view of FIG. 4 are shown openings 46 and 48 of paired fuel and igniter conduits 42 and 44. The igniter conduits 42, as can be seen, support therewithin ignition wires 50 which have a spark-producing gap in registry with an opening 48. The immediately adjacent fuel conduit opening 46, of course, vents a fuel therethrough. Accordingly, with the initiation of a spark at an opening 48, the fuel venting in adjacency thereto is ignited at opening 46 on its issuance therethrough.

Openings 46 and 48 are arranged in a given "downstream" location along the wall, companion openings 46' and 48' are located further "up-stream", and openings 46" and 48" are located still further "up-stream". Thus, selectively, one or two or three additional fuels, or supplemental supplies of the same fuel (input via port 16), or only one additional fuel and further supplies of the same basic fuel — whatever — may be addressed to the combustion chamber. In fact, port 16 and spark plug 20 may be dispensed with, and all fueling and ignition of the engine 10 can be accomplished by means of the conduits 42 and 44 only. Clearly, the progressive or stepped arrangement of the openings 46 and 48 (and 46', 48', 46", and 48") can be used, selectively, to generate a flame or combustion propagation which is the more efficient for the engine loading being practiced. It remains only to couple the fueling and ignition with synchronized and synchronizable fuel and ignition distributors. Such an arrangement is shown in FIG. 5, where the invention is shown in combination with a reciproacting-piston engine 10'.

In engine 10', only by way of depicting an alternative arrangement, two pairs of ignition and fuel conduits 42 and 44 are shown in common planes (transverse of the cylinder 52) opening onto the combustion chamber 14'. Here too, the wall of the cylinder 52 confines therewithin coolant conduits 32. A fuel supply 54 is coupled to a fuel distributor 56 — for supplying a fuel or fuels to fuel conduits 42. Also, the ignition wires 50 are joined to ground 58 and a source of B+ 60 through an ignition distributor 62. Both distributors 56 and 62 are linked via signalling means 64, in a manner well known in the art, to insure that an electrical potential is transmitted to wires 50 in an optimum timing commensurate with the input of fuel (or fuels) via distributor 56.

Figure 5:
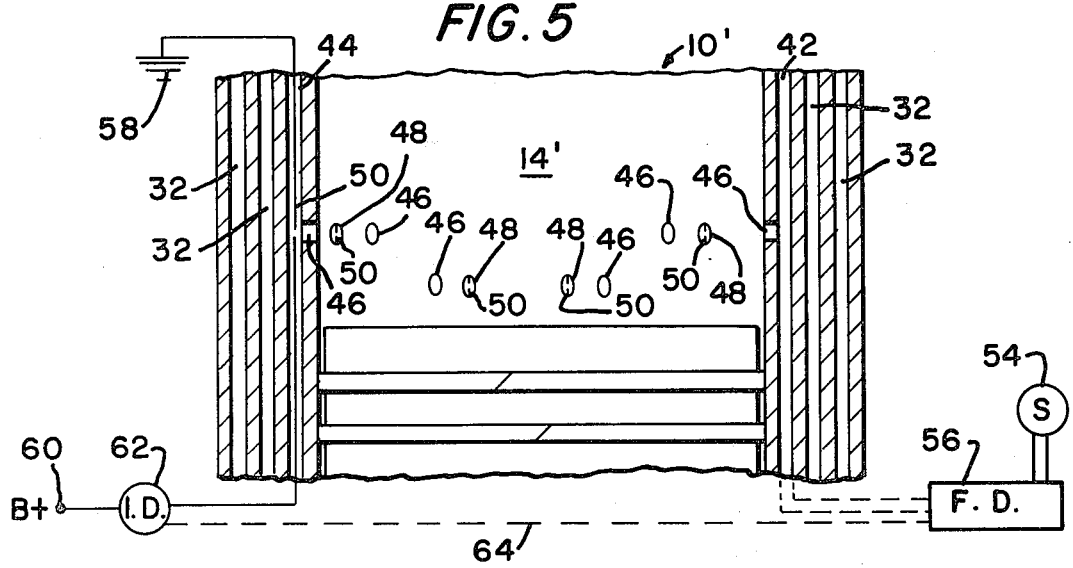
FIG. 5 is an elevational view, in cross-section, of a reciprocating, internal combustion engine piston and cylinder which also embodies the novel invention.

In the FIG. 5 illustration, only single channels of fuel and ignition distribution are shown; this is done only to insure that the disclosure will not by unduly complicated. It will be readily understood, however, that the distributors 56 and 62 comprise devices which are capable, respectively, of receiving a plurality of fuels and discharging the same to selected conduits 42, and successively and sequentially communicating electrical potential to selected conduits 44.

An an ancillary feature of the invention, I set forth means for introducing fuel into the combustion chamber 14 — for instance — of engine 10, also by way of the rotary piston 18. In this arrangement, priorly known from U.S. Pat. No. 3,941,098, issued to Thomas C. Roberts, on 2 Mar. 1976, for a "Rotary Engine with Fuel Supply through Rotor", the rotor or rotary piston 18 has a plurality of short conduits 66 which, cyclically, come into registry with a longer fuel conduit 68 formed in the piston 18. The registry occurs when the conduits 66 are closing upon the spark plug 20.

FIG. 6 is a fragmentary cross-section, similar to that of FIG. 4, taken through the wall of the rotary, internal combustion engine, the depiction being enlarged over the scale of FIG. 4, showing an alternative embodiment of the invention. In this arrangement, tubings 148 are arranged in the engine wall, in combination with the coolant conduits 32. Here, however, the tubings — formed of electrically-conductive material (i.e., copper, in this embodiment) — serve dual functions. Each thereof conducts a fuel therethrough to a selected opening: 146a, 146b, 146c, etc. formed through the engine wall. As seen in FIG. 7, a cross-section taken along 7—7 of FIG. 6, a fuel supply reservoir 154 provides fuel to the tubings 148 via a manifold line 156. Thus, the fuel is admittable into the engine in progressively staggered fashion. In addition, however, the tubings are connected across a source 160 of potential ("B+") and a ground 158; further, each of the tubings 148 have particularly arranged interruptions 150 formed therein upstream of the openings (146a, 146b, etc.). By this provisioning, sparking occurs at the interruptions 150, and ignite the fuel coursing through the tubings 148, in advance of the fuel-exiting at the openings. Accordingly, portions of the tubings 148 upstream of the interruptions 150 function as pre-combustion chambers. Clearly, in accord with the control arrangements noted in connection with the embodiments of FIGS. 1–5, one may optionally employ fuel and ignition distributors, or either, to effect such performance as is desired for a particular application of the engine.

Yet a further alternative embodiment of the invention is shown in FIG. 8 where only a fragmentary portion of the engine wall is shown with a whole, i.e., uninterrupted tubing 148' confined therein. A same opening 146a communicates the tubing 148' with the inner surface of the wall — that is, the combustion chamber. Here, however, the tubing 148' carries a plurality of ignition wires 152. Wires 152 have variously disposed interruptions 150a upstream of the opening 146a. The interruptions 150a will assure a uniformity and consistency of fuel burning in the "pre-combustion" chamber which the portion of tubing 148' defines.

While I have described my invention in connection with specific embodiments thereof, it is to be clearly understood that this is done only by way of example, and not as a limitation to the scope of my invention as set forth in the objects thereof and in the appended claims.

I claim:
1. An internal combustion engine, comprising:
    a housing having an arcuate wall;
    said housing defining a combustion chamber therewithin;
    a piston supported within said housing for movement in at least one direction;
    means formed in said housing for evacuating exhaust product from said combustion chamber;
    first means for supplying fuel to, and for igniting said fuel in, said combustion chamber; wherein
    said first means comprise a first plurality of longitudinal passageways formed within said housing wall, each passageway of said plurality thereof having a given opening which opens internally of said wall onto said combustion chamber; and
    said given openings of at least one pair of said passageways open onto said combustion chamber, within a prescribed location in said wall, in adjcency to each other; further including
    an electrical conduit, with a spark-gap interruption formed therein, disposed in at least one passageway of said pair;
    means for supplying electrical potential to said conduit; and
    means for supplying fuel to at least one passageway of said pair.
2. An engine, according to claim 1, further including:
    a second plurality of passageways formed in said wall; and
    means for supplying coolant to said second plurality of passageways.
3. An engine, according to claim 1, further including:
    second means for supplying fuel to said combustion chamber; wherein
    said second fuel supplying means comprises a fuel port formed transversely through said wall, said port having an opening in said chamber which is remotely space-apart from said prescribed location.
4. An engine, according to claim 1, wherein:
    said speak-gap interruption is aligned in juxtaposed registry with said one passageway opening.
5. An internal combustion engine, according to claim 1, wherein:
    said electricl conduit comprises means for reinforcing said housing.
6. An engine, according to claim 1, further including:
    a first distributor means coupled to said electrical potential means for controlling the supply of potential to said one conduit; and
    a second distributor means coupled to said fuel supplying means for controlling the supply of fuel to said other passageway.
7. An engine, according to claim 6, wherein:
    said spark-gap interruption is in a location upstream of said one passageway opening of said passageway in which said interruption is formed, relative to fuel supplying flow direction of fuel supply to said one passageway to cause said latter one passagewwy to be defined and to function as, a pre-combustion chamber upstream of said given in said latter one passageway.
8. An engine, according to claim 1, wherein:
    said first plurality of passageways comprises a second pair of passageways;
    said given openings of said second pair of passageways open onto said combustion chamber, in adjacency to each other, within a location spaced-apart from said prescribed location in said one direction; and further including
    another electrical conduit, with a spark-gap interruption formed therein, disposed in at least a first passageway of said second pair of passageways;
    means for supplying electrical potential to said another conduit; and
    means for supplying fuel to at least one passageway of said second pair.
9. An engine, according to claim to claim 8, wherein:
    said first plurality of passageways comprises, further, a third pair of passageways;
    said given openings of said third pair of said passageways open onto said combustion chamber, in adjacency to each other, within a location intermediate said prescribed and spaced-apart locations; and further including
    a further electrical conduit, with a spark-gap interruption formed therein, disposed in at least a first passageway of said third pair of passageways;
    means for supplying electrical potential to said further conduit; and
    means for supplying fuel to at least one passageway of said third pair.
10. An engine, according to claim 9, further including:
    a second plurality of longitudinal passageways formed in said wall;
    said second plurality of passageways extending substantially parallel with said first plurality of passageways; and
    means for supplying coolant to said second plurality of passageways.
11. An engine, according to claim 10, wherein:
    said housing is formed of ceramic material.

* * * * *